(12) United States Patent
Gold et al.

(10) Patent No.: US 11,926,106 B2
(45) Date of Patent: Mar. 12, 2024

(54) ADDITIVELY MANUFACTURED COMPONENT HAVING SURFACE FEATURES FOR PART IDENTIFICATION

(71) Applicant: General Electric Company, Schenectady, NY (US)

(72) Inventors: Scott Alan Gold, West Chester, OH (US); Thomas Graham Spears, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/374,049

(22) Filed: Jul. 13, 2021

(65) Prior Publication Data
US 2021/0339317 A1    Nov. 4, 2021

Related U.S. Application Data

(62) Division of application No. 15/479,339, filed on Apr. 5, 2017, now Pat. No. 11,090,727.

(51) Int. Cl.
*B33Y 80/00* (2015.01)
*B22F 10/25* (2021.01)
(Continued)

(52) U.S. Cl.
CPC .............. *B29C 64/40* (2017.08); *B22F 10/25* (2021.01); *B22F 10/28* (2021.01); *B22F 10/36* (2021.01);
(Continued)

(58) Field of Classification Search
CPC .......... B22F 10/20; B22F 10/30; B22F 10/25; B22F 10/28; B22F 10/36; B22F 10/38;
(Continued)

(56) References Cited

U.S. PATENT DOCUMENTS

| 4,350,883 A | 9/1982 | Lagarde |
| 4,806,740 A | 2/1989 | Gold et al. |

(Continued)

FOREIGN PATENT DOCUMENTS

WO    2016109111 A1    7/2016

OTHER PUBLICATIONS

Cambridge Dictionary definition of "bump", https://dictionary.cambridge.org/US/dictionary/english/bump, last accessed Dec. 7, 2022. (Year: 2022).*

(Continued)

*Primary Examiner* — Rebecca Janssen
(74) *Attorney, Agent, or Firm* — Dinsmore & Shohl LLP (57) ABSTRACT

An additively manufactured component and a method for manufacturing the same are provided. The additively manufactured component includes a cross sectional layer having a surface surrounding the cross sectional layer. The cross sectional layer is formed by moving a focal point of an energy source over a bed of additive material. A surface irregularity is formed on the surface by manipulating the energy level of the energy source. The surface may include a datum feature positioned at a predetermined location relative to the surface irregularity and the surface irregularity may be greater than a surface roughness of the surface but less than one millimeter.

4 Claims, 4 Drawing Sheets

(51) Int. Cl.
*B22F 10/28* (2021.01)
*B22F 10/36* (2021.01)
*B22F 10/38* (2021.01)
*B29C 64/153* (2017.01)
*B29C 64/386* (2017.01)
*B29C 64/40* (2017.01)
*B33Y 10/00* (2015.01)
*B33Y 50/02* (2015.01)
*B33Y 70/00* (2020.01)
*B33Y 30/00* (2015.01)

(52) U.S. Cl.
CPC ............ *B22F 10/38* (2021.01); *B29C 64/153* (2017.08); *B29C 64/386* (2017.08); *B33Y 10/00* (2014.12); *B33Y 50/02* (2014.12); *B33Y 70/00* (2014.12); *B33Y 80/00* (2014.12); *B33Y 30/00* (2014.12); *Y02P 10/25* (2015.11)

(58) Field of Classification Search
CPC ..... B29C 64/153; B29C 64/386; B29C 64/40; B33Y 10/00; B33Y 50/02; B33Y 80/00; B33Y 30/00; B33Y 70/00; Y02P 10/25
See application file for complete search history.

(56) References Cited

U.S. PATENT DOCUMENTS

| | | | |
|---|---|---|---|
| 5,313,193 A | 5/1994 | Dubois et al. | |
| 5,546,462 A | 8/1996 | Indeck et al. | |
| 6,337,122 B1 | 1/2002 | Grigg et al. | |
| 6,400,037 B1 * | 6/2002 | Omizo ................. | H01L 23/544 438/106 |
| 6,640,632 B1 | 11/2003 | Hatanaka et al. | |
| 6,850,592 B2 | 2/2005 | Schramm et al. | |
| 6,976,627 B1 | 12/2005 | Culp et al. | |
| 7,148,448 B2 | 12/2006 | Warren, Jr. et al. | |
| 7,199,367 B2 | 4/2007 | Favro et al. | |
| 7,217,102 B2 | 5/2007 | Rockstroh et al. | |
| 7,250,864 B2 | 7/2007 | Murofushi et al. | |
| 7,584,833 B2 | 9/2009 | Howells | |
| 7,602,963 B2 | 10/2009 | Nightingale et al. | |
| 8,222,567 B2 | 7/2012 | Mathai et al. | |
| 8,536,860 B2 | 9/2013 | Boenisch | |
| 8,935,286 B1 | 1/2015 | Westerman, Jr. et al. | |
| 8,973,829 B2 | 3/2015 | Atkinson et al. | |
| 8,985,471 B2 | 3/2015 | Freeman | |
| 9,036,916 B2 | 5/2015 | Le | |
| 9,074,927 B2 | 7/2015 | Singh et al. | |
| 9,250,183 B2 | 2/2016 | Smith et al. | |
| 9,311,652 B2 | 4/2016 | Farn et al. | |
| 9,360,589 B1 | 6/2016 | Meinhold et al. | |
| 9,400,910 B2 | 7/2016 | Kumar et al. | |
| 9,414,891 B2 | 8/2016 | Kieser | |
| 9,424,503 B2 | 8/2016 | Kieser | |
| 2002/0126889 A1 | 9/2002 | Pikler et al. | |
| 2008/0159529 A1 | 7/2008 | Aarts et al. | |
| 2009/0286007 A1 | 11/2009 | Brancher | |
| 2013/0193214 A1 | 8/2013 | Margulis et al. | |
| 2014/0205083 A1 | 7/2014 | Pryakhin et al. | |
| 2014/0263674 A1 | 9/2014 | Cerveny | |
| 2015/0147585 A1 | 5/2015 | Schwarze et al. | |
| 2015/0308337 A1 | 10/2015 | Marasco et al. | |
| 2015/0324677 A1 | 11/2015 | Talyansky et al. | |
| 2016/0010863 A1 * | 1/2016 | Ott ........................ | F28F 3/04 428/141 |
| 2016/0107764 A1 | 4/2016 | O'Kell et al. | |
| 2016/0207345 A1 | 7/2016 | Farmer et al. | |
| 2016/0253586 A1 | 9/2016 | Cook et al. | |
| 2016/0260001 A1 | 9/2016 | Flores et al. | |
| 2016/0283834 A1 | 9/2016 | Bobbitt, III | |
| 2016/0298268 A1 | 10/2016 | Gallucci et al. | |
| 2016/0306088 A1 | 10/2016 | Ouderkirk et al. | |
| 2016/0307083 A1 | 10/2016 | Kumar et al. | |
| 2016/0311164 A1 | 10/2016 | Miyano | |
| 2017/0120338 A1 | 5/2017 | Goeing et al. | |
| 2017/0203601 A1 | 7/2017 | Yashiki | |

OTHER PUBLICATIONS

I. Gibson, D.W. Rosen, and B. Stucker, Additive Manufacturing Technologies, DOI 10.1007/978—pp. 103-117, Spring Science+Business Media, LLC 2010.

* cited by examiner

ADDITIVELY MANUFACTURED COMPONENT HAVING SURFACE FEATURES FOR PART IDENTIFICATION

CROSS REFERENCE TO RELATED APPLICATIONS

The present application is a divisional application of and claims priority to and the benefit of U.S. Non-Provisional patent application Ser. No. 15/479,339 filed on Apr. 5, 2017, the contents of which are hereby incorporated by reference in its entirety.

FIELD

The present subject matter relates generally to additively manufactured components, and more particularly, to additively manufactured components including features for improved part identification or counterfeit prevention.

BACKGROUND

Original equipment manufacturers (OEMs) in a variety of industries have an interest in ensuring that replacement components used with their products or equipment are manufactured according to standards set and controlled by the OEM. Using the aviation industry as an example, the manufacturer of a gas turbine engine, as well as the airlines and the passengers that rely on them, can be exposed to serious risks if counterfeit or replica replacement parts are readily available for and installed on these engines.

For example, such counterfeit components can pose a severe risk to the integrity of the gas turbine engines or may otherwise result in a variety of problems for the OEM and the end user. More specifically, OEM components may require rigorous attention to detail to ensure sound material properties and capabilities for the specific application as well as sophisticated inspections to verify the component performance. OEMs cannot ensure the integrity or compatibility of counterfeit parts, which may result in dangerous engine operation and increase the risk of potential failure.

In addition, counterfeit parts compromise the OEMs ability to control the quality associated with their products. For example, inexpensive replicas and inferior components on the market are a real threat, both to the engines on which they are installed and to the reputation of the OEM. Moreover, failure of a gas turbine engine due to a counterfeit replacement component might subject the OEM to misdirected legal liability and OEMs may lose a significant revenue stream by not being able to control the sale of OEM replacement components.

Additive manufacturing technologies are maturing at a fast pace. For example, very accurate additive manufacturing printers using a variety of materials, such as metals and polymers, are becoming available at decreasing costs. In addition, improved scanning technologies and modeling tools are now available. As a result, certain OEMs are beginning to use such technologies to produce original and replacement parts. However, the advance of additive manufacturing technologies also results in a lower barrier to entry into the additive manufacturing space. Therefore, replacement components may be more easily reverse engineered and copied, and there is an increased risk of third parties manufacturing and installing counterfeit components on OEM equipment, such as a gas turbine engine, resulting in the dangers described briefly above.

There is thus a need for a technology that allows genuine parts to be distinguished from counterfeits to ensure that parts created through additive manufacturing cannot be duplicated by an unauthorized third party and passed off as genuine OEM parts. Accordingly, additively manufactured components including features that may be used to identify, authenticate, and distinguish genuine parts from counterfeit parts would be useful.

BRIEF DESCRIPTION

Aspects and advantages of the invention will be set forth in part in the following description, or may be obvious from the description, or may be learned through practice of the invention.

In one exemplary embodiment of the present disclosure, a method for additively manufacturing a component is provided. The method includes forming a cross sectional layer by moving a focal point of an energy source over a bed of additive material, the cross sectional layer defining a surface. The method further includes manipulating the energy level of the energy source to form a surface irregularity on the surface.

In another exemplary aspect of the present disclosure, an additively manufactured component is provided. The additively manufactured component includes one or more cross sectional layers defining a surface having a surface roughness. A datum feature is defined by the surface and a surface irregularity is defined by the surface, wherein the surface irregularity has a size that is greater than the surface roughness of the surface and is less than one millimeter.

In still another exemplary aspect of the present disclosure, a method for additively manufacturing a component is provided. The method includes depositing a layer of additive material on a bed of an additive manufacturing machine. A cross sectional layer is formed by selectively exposing the layer of additive material to energy from an energy source, the cross sectional layer having a surface including a datum feature. A surface irregularity is formed on the surface at a predetermined location relative to the datum feature by manipulating an energy level of the energy source These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The present disclosure is generally directed to an additively manufactured component and a method for manufacturing the same. The additively manufactured component includes a cross sectional layer having a surface surrounding the cross sectional layer. The cross sectional layer is formed by moving a focal point of an energy source over a bed of additive material. A surface irregularity is formed on the surface by manipulating the energy level of the energy source. The surface may include a datum feature positioned at a predetermined location relative to the surface irregularity and the surface irregularity may be greater than a surface roughness of the surface but less than one millimeter.

Notably, the additive manufacturing methods described herein enable the manufacture of components having various features, configurations, thicknesses, materials, and density variations not possible using prior manufacturing methods. It should be appreciated that the additive manufacturing techniques discussed herein may be used to manufacture other components for use in any suitable device, for any suitable purpose, and in any suitable industry. The exemplary embodiments described herein are used only to illustrate exemplary aspects of the present subject matter and are not intended to limit the scope of the present disclosure in any manner.

In general, the components described herein may be manufactured or formed using any suitable process. However, in accordance with several aspects of the present subject matter, these components may be formed using an additive-manufacturing process, such as a 3-D printing process. The use of such a process may allow the components to be formed integrally, as a single monolithic component, or as any suitable number of sub-components. In particular, the manufacturing process may allow these components to be integrally formed and include a variety of features not possible when using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or any surface features such as irregularities or datum features, as well as internal passageways, openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e g., made smoother or rougher) by selecting appropriate laser scan parameters (e.g., laser power, scan speed, laser focal spot size, overlap between passes, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and novel surface features. All of these features may be relatively complex and intricate for avoiding detection and/or impeding counterfeiting by a third party. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved performance and may be easily distinguished from replicas or counterfeit components.

Figure 1:
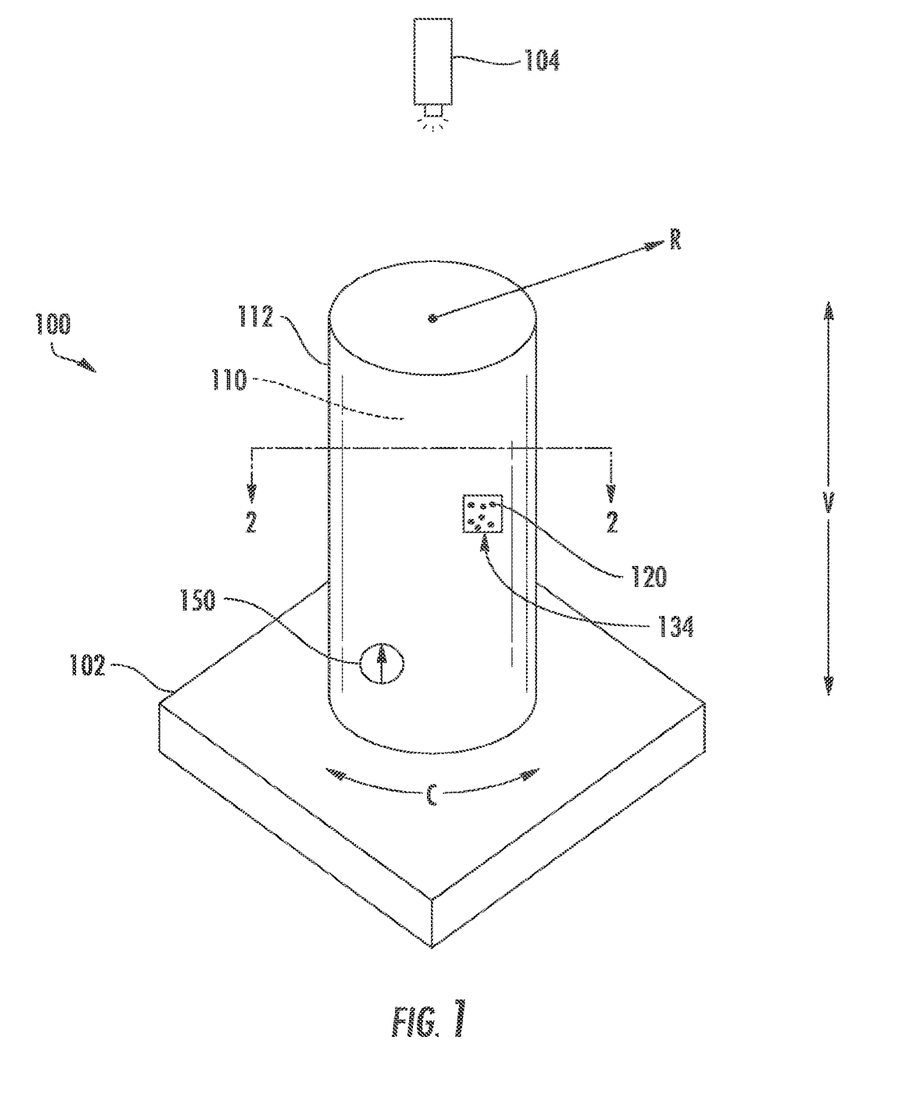
FIG. 1 provides a perspective view of an additively manufactured component according to an exemplary embodiment of the present subject matter.
Figure 2:
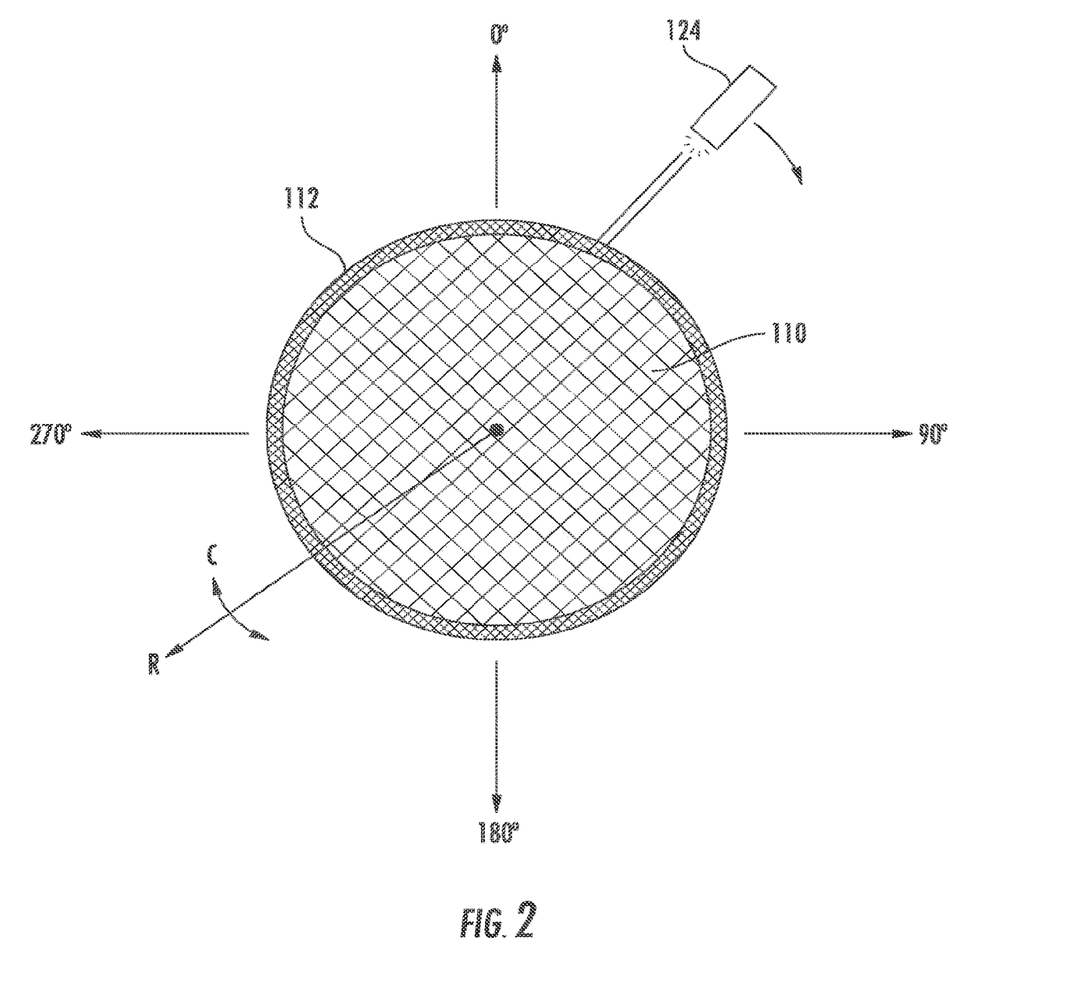
FIG. 2 provides a cross sectional view of the exemplary component of FIG. 1, taken along Line 2-2 of FIG. 1.
Figure 3:
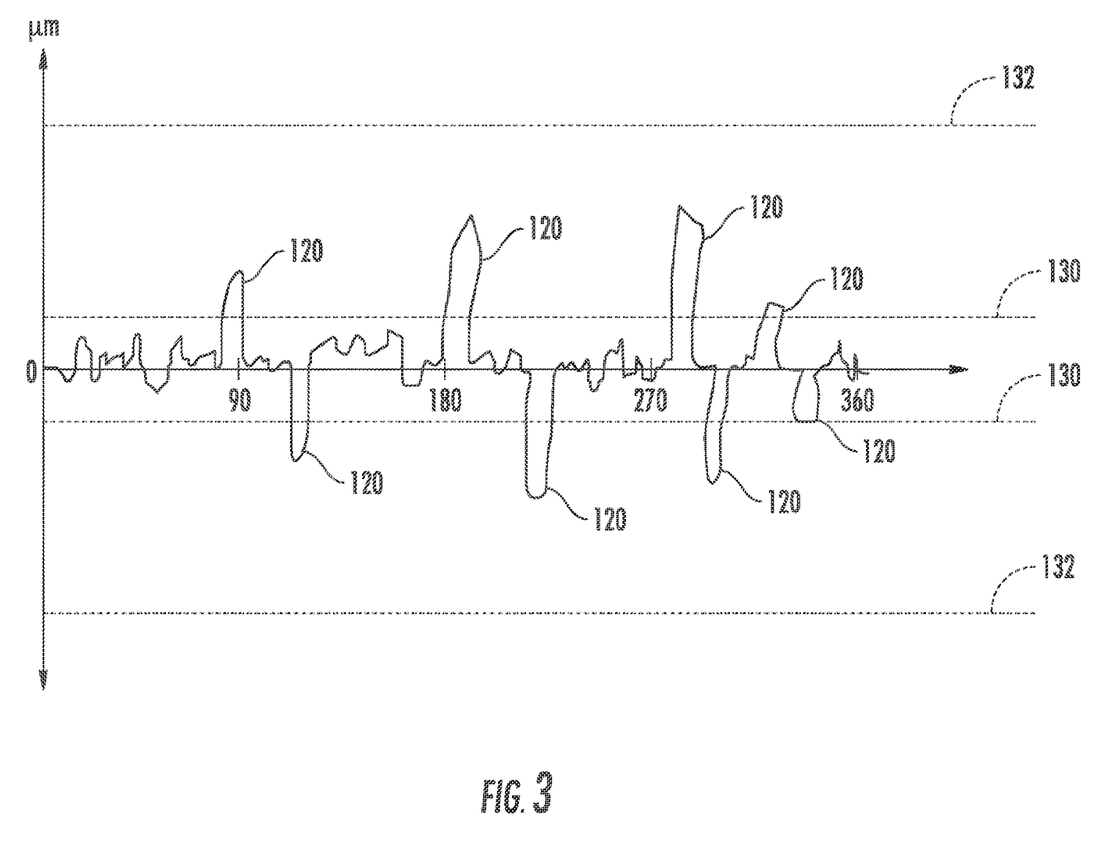
FIG. 3 is a plot illustrating the variation of a surface height of the exemplary component of FIG. 1 about a circumferential direction according to an exemplary embodiment of the present subject matter.

Referring now to FIGS. 1 through 3 an additively manufactured component 100 according to an exemplary embodiment of the present subject matter is provided. More specifically, FIG. 1 provides a perspective view of component 100 and FIG. 2 provides a cross sectional view of component 100, taken along Line 2-2 of FIG. 1. FIG. 3 provides a plot illustrating the variation in surface height of component 100 about the circumferential direction, as measured and described below.

Referring now specifically to FIG. 1, for the purpose of explaining aspects of the present subject matter, component 100 is a simple, solid cylinder. However, it should be appreciated that the additive manufacturing methods described herein may be used to form any suitable component for any suitable device, regardless of its material or complexity. As illustrated, component generally defines a radial direction R, a circumferential direction C, and a vertical direction V.

Also illustrated in FIG. 1 is an additive manufacturing platform 102 and an energy source 104, as may be used according to any of the additive manufacturing methods described above. For example, component 100 may be constructed by laying a powder bed onto platform 102 and selectively fusing the powder bed at desired locations using energy source 104 to form a layer of component 100. Platform 102 may be lowered along the vertical direction V after each layer is formed and the process may be repeated until component 100 is complete.

Referring to FIG. 2, a cross sectional view of component 100 taken along Line 2-2 (or more specifically, a plane corresponding to this line) will be described. It should be appreciated that FIG. 2 illustrates a top view of a single additively manufactured layer of component 100 having a finite thickness. As illustrated, component 100 includes a cross sectional layer 110. Cross sectional layer 110 may generally define an interior body layer and a surface 112. As used herein, "interior body layer" may refer to any structure, body, surface, base layer, or other portion of component 100 on which a surface may be formed. In this regard, for example, component 100 includes surface 112 that is formed around cross sectional layer 110, i.e., along a perimeter or periphery of cross sectional layer 110 along the circumferential direction C. As used herein, "surface" may refer to the periphery of one or more cross sectional layer 110 of component 100, e.g., formed on an otherwise exposed interior body layer.

According to the illustrated embodiment, cross sectional layer 110 and surface 112 may be formed at different energy levels and may have different structural characteristics. As used herein, an "energy level" of an energy source is used generally to refer to the magnitude of energy the energy source delivers to a particular point or region of component 100. For example, if the energy source is a laser or an electron beam, the energy level is generally a function of the power level and the scan speed of the laser or electron beam. As used herein, "scan speed" is used generally to refer to the linear velocity of the energy source along a surface of the additively manufactured component. Notably, the energy level of an energy source directed toward a powder bed may also be adjusted by increasing or decreasing the overlap between adjacent passes of the energy source over the powder bed.

Adjusting the energy level of energy source 104 can enable the formation of component 100 with different regions having different densities and structural properties. For example, a higher energy level may be achieved by increasing the power level of energy source 104 (e.g., in Watts), decreasing its scan speed, or increasing the overlap between adjacent passes of energy source 104 to direct more energy onto a single area of the powder bed. By contrast, a lower energy level may be achieved by decreasing the power level of energy source 104, increasing its scan speed, or decreasing the overlap between adjacent passes of energy source 104 to direct less energy onto a single area of the powder bed.

According to the exemplary embodiment, component 100 is formed by moving energy source 104 (or more specifically, a focal point of the energy source 104, as shown in FIG. 1) along a powder bed placed on platform 102 to fuse together material to form component 100. According to the exemplary embodiment, a first energy level (e.g., a higher energy level) is used to form cross sectional layer 110 and a second energy level (e.g., a lower energy level) is used to form surface 112. It should be appreciated that this is only one exemplary construction of component 100. According to alternative embodiments, components formed using the methods described herein may have any suitable size and number of sections formed using any suitable energy source, at any suitable energy level, and having any suitable scanning strategy.

According to the illustrated embodiment, component 100 includes at least one surface irregularity 120 formed at least in part within surface 112 of component 100. Surface irregularities 120 may be any identifiable deviation from surface 112 of component 100 which may be used to identify, authenticate, or distinguish component 100. For example, surface irregularities 120 may be any sequence of bump, divots, or other surface aberrations that contain or define encoded information in a manner analogous to a printed serial number, a bar code, or a QR code, e.g., for uniquely identifying component 100.

Surface irregularities 120 may be formed, for example, by manipulating the energy level of energy source 104. For example, as explained above, surface 112 is generally formed by moving energy source 104 at an energy level. By altering the energy level at select locations along surface 112, the amount of powder that is fused may be changed to alter the characteristics of surface 112. For example, surface irregularities 120 may be bumps formed by increasing the energy level of energy source 104 at select locations. In this regard, for example, the power of energy source 104 may be increased or the scan speed may be slowed to fuse more powder. By contrast, surface irregularities 120 may be divots formed by decreasing an energy level of energy source 104 at select locations. In this regard, for example, the power of energy source 104 may be decreased or the scan speed may be increased to fuse less powder.

Referring now to FIG. 3, a plot illustrating the variation in surface height of surface 112 of component 100 about the circumferential direction C is provided according to an exemplary embodiment. More specifically, FIG. 3 illustrates surface height variations relative to a nominal surface level as measured by a scanning device 124 (FIG. 2) that travels 360 degrees around component 100 along the circumferential direction C. Scanning device 124 may be an optical sensor (e.g., a laser), a tactile sensor (e.g., a measurement probe or contact profilometer), or any other suitable device for sensing, measuring, or reading a surface of a component. According to this exemplary embodiment, surface irregularities 120 define a unique component identifier within a single band or layer of component 100 along the vertical direction V. However, it should be appreciated that this unique component identifier may instead by located within multiple layers of component 100 and may be localized to one or more regions on surface 112 (see, e.g., FIG. 1), as explained below.

Notably, surface 112 will have a surface roughness after formation. As used herein, "surface roughness" is used generally to refer to the texture of surface 112 and is quantified as a deviation from a nominal, ideal surface as measured along a direction normal to surface 112. e.g., the radial direction R. Surface roughness may be quantified generally according to the micrometer (μm) Ra, where Ra is the arithmetic mean of deviation values as calculated to quantify the degree of roughness over a range of collected roughness data points. For example, surface 112 can have a surface roughness of about 5 μm Ra to about 100 μm Ra. More specifically, referring to FIG. 3, the surface roughness of surface 112 does not exceed a maximum surface roughness (as identified by reference numeral 130) which is about fifty μm Ra relative to nominal (i.e., plus or minus fifty μm Ra). It should be appreciated, that as used herein, terms of approximation, such as "approximately," "substantially," or "about," refer to being within a ten percent margin of error.

In order to differentiate between inherent surface roughness of surface 112 of component 100, surface irregularities 120 may have a minimum size. For example, according the exemplary embodiment, surface irregularities 120 are all greater than the maximum surface roughness (indicated by dotted lines 130 in FIG. 3). However, it may be desirable to make locating and identifying surface irregularities 120 more difficult, e.g., to avoid detection using conventional low-tech scanning means. Therefore, according to an exemplary embodiment, surface irregularities 120 may be small enough to be undetectable to the human eye or may require specialized scanning means to locate and read surface irregularities 120. For example, according to the illustrated embodiment, surface irregularities 120 have a size that is less than one millimeter (as indicated by dotted lines 132 in FIG. 3).

According to an exemplary embodiment of the present subject matter, it may be desirable to include one or more additional features on component 100 which assist an end user in locating an identifying region 134 which may contain surface irregularities 120. For example, as explained above, surface irregularities 120 may not be visible to the human eye. Thus, to avoid the need to scan the entire surface 112 to locate and read surface irregularities 120, one or more datum features may be used as a reference from which an authorized end user may find identifying region 134.

More specifically, referring again to FIG. 1, component 100 further includes a datum feature 150 that is visible to the human eye or otherwise easily detectable. For example, according to the exemplary embodiment, datum feature 150 has a size that is greater than about one millimeter. Moreover, datum feature 150 may indicate both a position and an orientation of component 100. According to the illustrated embodiment, datum feature 150 is formed within surface 112 of component 100. However, it should be appreciated that according to alternative embodiments, datum feature 150 may be formed within the interior of component 100 or cross sectional layer 110 and/or within both the interior of cross sectional layer 110 and surface 112 of component.

Datum feature 150 is located at a predetermined location relative to identifying region 134—and thus surface irregularities 120. In this manner, an authorized third party who knows the relative positioning of datum feature 150 and identifying region 134 may easily locate datum feature 150 and use it as a reference for locating and scanning identifying region 134 to read surface irregularities 120.

Now that the construction and configuration of component 100 according to an exemplary embodiment of the present subject matter has been presented, an exemplary method 200 for forming a component according to an exemplary embodiment of the present subject matter is provided. Method 200 can be used to form component 100, or any other suitable part or component. It should be appreciated that the exemplary method 200 is discussed herein only to describe exemplary aspects of the present subject matter, and is not intended to be limiting.

Figure 4:
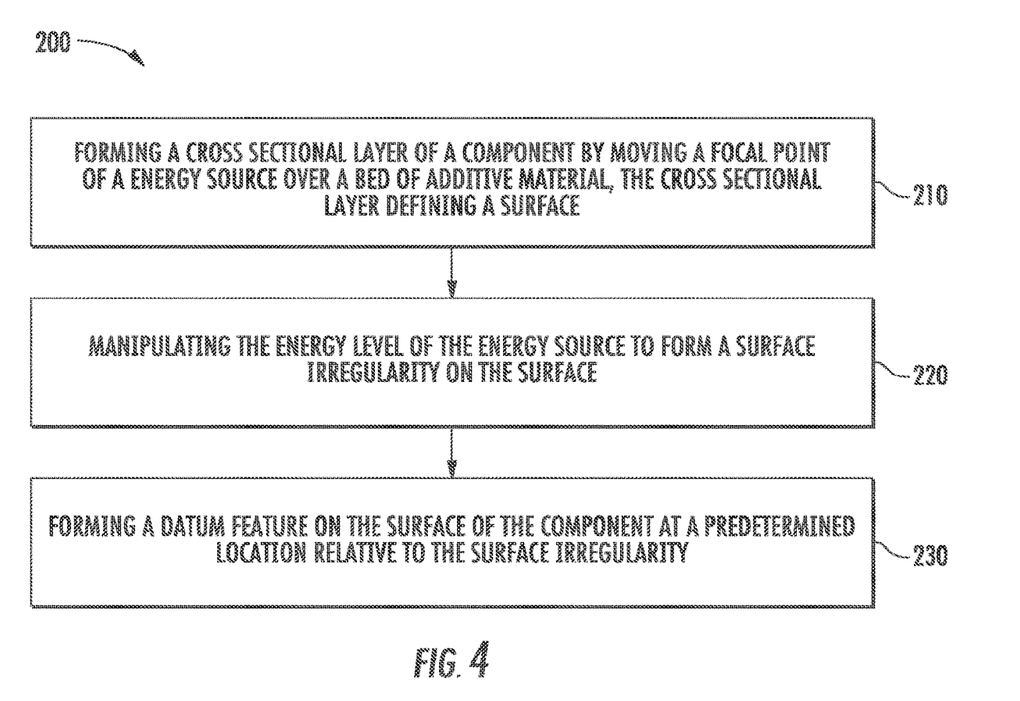
FIG. 4 is a method for additively manufacturing a component according to an exemplary embodiment of the present subject matter.

Referring now to FIG. 4, method 200 includes, at step 210, forming a cross sectional layer of a component by moving a focal point of an energy source over a bed of additive material, the cross sectional layer defining a surface. Step 220 includes manipulating the energy level of the energy source to form a surface irregularity on the surface. According to exemplary embodiments, the surface further includes a datum feature which may be used to determine a specific position on the component and the component orientation. Step 230 includes forming a datum feature on the surface of the component at a predetermined location relative to the surface irregularity by manipulating the energy level of the energy source. In this manner, by manipulating the level of the energy source, identifying features may be formed on the surface of the component without any extra post-processing steps or increases in manufacturing costs.

An additively manufactured component and a method for manufacturing that component are described above. Using the additive manufacturing methods described herein, the component may include identifying features that are smaller, more complex, and more intricate than possible using prior manufacturing methods. In addition, these features may be difficult or impossible to detect, very difficult to reverse engineer, and nearly impossible reproduce, e.g., for the purpose of producing counterfeit products. For example, the surface irregularities may be designed to appear random and non-obvious. These features may further be formed such that they are not visible to the human eye and may be read using laser scanning methods directed to a specific identifying region of the component that is unknown to third parties. These features may be introduced during the design of the component, such that they may be easily integrated into components during the build process at little or no additional cost. The features may also serve as a robust identifier capable of withstanding high temperatures without degradation throughout the life of the component, with little or no impact on the quality of the component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additively manufactured component comprising:
   one or more cross sectional layers defining a surface having a surface roughness;
   a datum feature defined by the surface; and
   a surface irregularity defined by the surface,
   wherein the surface irregularity has a size that is greater than the surface roughness of the surface and is less than one millimeter,
   wherein the surface irregularity is at a predetermined location relative to the datum feature, the datum feature indicating a position of the predetermined location,
   wherein the datum feature has a size that is greater than about one millimeter, and
   wherein the surface irregularity comprises a surface aberration that defines encoded information.

2. The component of claim 1, wherein the surface irregularity is a bump or a divot formed by adjusting an energy level of an energy source.

3. The component of claim 1, wherein the surface roughness is less than about fifty micrometers.

4. The component of claim 1, wherein the datum feature is formed within both an interior of the cross sectional layer and in the surface of the component.

* * * * *